(12) United States Patent
Collins et al.

(10) Patent No.: US 12,084,959 B2
(45) Date of Patent: Sep. 10, 2024

(54) ESTIMATING BOREHOLE SHAPE BETWEEN STATIONARY SURVEY LOCATIONS

(71) Applicant: Halliburton Energy Services, Inc., Houston, TX (US)

(72) Inventors: Mark Vincent Collins, Spring, TX (US); Umut Zalluhoglu, Humble, TX (US); Wei Zhang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 660 days.

(21) Appl. No.: 16/904,777

(22) Filed: Jun. 18, 2020

(65) Prior Publication Data

US 2021/0396127 A1 Dec. 23, 2021

(51) Int. Cl.
*E21B 47/022* (2012.01)
*E21B 7/04* (2006.01)
*E21B 44/00* (2006.01)
*G01V 20/00* (2024.01)

(52) U.S. Cl.
CPC ............ *E21B 47/022* (2013.01); *E21B 7/04* (2013.01); *E21B 44/00* (2013.01); *G01V 20/00* (2024.01)

(58) Field of Classification Search
CPC .......... E21B 47/022; E21B 7/04; E21B 44/00; E21B 2200/20; G01V 99/005
See application file for complete search history.

(56) References Cited

U.S. PATENT DOCUMENTS

| | | | | |
|---|---|---|---|---|
| 6,302,221 | B1 * | 10/2001 | Hamman | G01V 1/306 |
| | | | | 175/50 |
| 7,999,695 | B2 * | 8/2011 | Rodney | E21B 47/12 |
| | | | | 73/152.01 |
| 10,781,691 | B2 * | 9/2020 | Ledroz | E21B 47/00 |

(Continued)

OTHER PUBLICATIONS

Z. Huang and et al., "Multi-Stage Pedestrian Positioning Using Filtered WiFi Scanner Data in an Urban Road Environment", Sensors 2020, 20, 3259; doi:10.3390/s20113259, www.mdpi.com/journal/sensors, Jun. 8, 2020 (Year: 2020).*

(Continued)

*Primary Examiner* — Douglas Kay
(74) *Attorney, Agent, or Firm* — Benjamin Ford; Parker Justiss, P.C.

(57) ABSTRACT

This disclosure presents a method and process to improve the accuracy of the calculations for true vertical depth and Eastings and Northings pair of a borehole while drilling operations are in progress. The method utilizes continuous survey parameters that are collected while drilling operations are in progress, and that have been collected between two neighboring stationary survey parameters. The stationary survey parameters are assumed to be ground truth and are fused with an invertible solution to a low order polynomial to generate the true vertical depth and an Eastings and Northings pair at each continuous survey location. An objective function can be used to optimize and solve the polynomial. The method can be performed on a well site controller, a geo-steering system, a bottom hole assembly, or other computing system capable of receiving the collected measurements, performing the method steps, and communicating the resultant borehole position parameters to other systems.

20 Claims, 7 Drawing Sheets

(56) References Cited

U.S. PATENT DOCUMENTS

| | | | |
|---|---|---|---|
| 2011/0161009 A1* | 6/2011 | Wang | G01V 5/04 |
| | | | 702/9 |
| 2012/0209566 A1* | 8/2012 | Idiart | G01D 5/24461 |
| | | | 702/179 |
| 2012/0330551 A1* | 12/2012 | Mitchell | E21B 47/022 |
| | | | 702/9 |
| 2016/0161626 A1* | 6/2016 | Maus | G01V 3/087 |
| | | | 324/346 |
| 2016/0333673 A1* | 11/2016 | Anno | G05B 15/02 |
| 2017/0123089 A1* | 5/2017 | Walters | E21B 43/26 |
| 2017/0175517 A1* | 6/2017 | Ledroz | G01C 21/16 |
| 2017/0260834 A1* | 9/2017 | Chacon | E21B 47/00 |
| 2018/0128101 A1* | 5/2018 | Ledroz | E21B 49/00 |
| 2018/0274354 A1* | 9/2018 | Nesgaard | E21B 47/12 |
| 2019/0330979 A1* | 10/2019 | Weston | E21B 47/18 |
| 2020/0095860 A1* | 3/2020 | Zalluhoglu | E21B 47/022 |
| 2020/0248545 A1* | 8/2020 | Maus | E21B 47/09 |
| 2021/0131269 A1* | 5/2021 | Joseph | F16K 37/0041 |
| 2021/0285297 A1* | 9/2021 | Larsen | E21B 7/046 |
| 2021/0404854 A1* | 12/2021 | Patel | F04D 15/0088 |

OTHER PUBLICATIONS

Oyedere, Mayowa Olugbenga. "Improved torque and drag modeling using traditional and machine learning methods." PhD diss., 2020 (Year: 2020).*

Kaufman, Linda. "Maximum likelihood, least squares, and penalized least squares for PET." IEEE transactions on medical imaging 12, No. 2 (1993): 200-214 (Year: 1993).*

M. F. Abughaban and et al., "Advanced Trajectory Computational Model Improves Calculated Borehole Positioning, Tortuosity and Rugosity", e IADC/SPE Drilling Conference and Exhibition held in Fort Worth, Texas, USA, Mar. 1-3, 2016 (Year: 2016).*

Sambridge, Malcolm. "Geophysical inversion with a neighbourhood algorithm-I. Searching a parameter space." Geophysical journal international 138, No. 2 (1999): 479-494 (Year: 1999).*

* cited by examiner

ESTIMATING BOREHOLE SHAPE BETWEEN STATIONARY SURVEY LOCATIONS

TECHNICAL FIELD

This application is directed, in general, to measuring the position of a wellbore and, more specifically, to measure the shape of a wellbore between ground truth measurements.

BACKGROUND

When developing and drilling boreholes for hydrocarbon production, it is important to be able to position the wellbore where desired proximate the surrounding geology of the subterranean formation. As drilling operations progress, the borehole position can change over time from what is intended. Currently, drilling operations are paused to take stationary surveys to measure and track the evolving shape of the borehole. Pausing drilling operations may result in additional costs and time for developing the well site. Being able to increase the distance between stationary surveys being conducted could reduce the drilling downtime thereby reducing costs incurred.

SUMMARY

In one aspect, a method is disclosed. In one embodiment, the method includes (1) receiving a first stationary survey parameter, wherein the first stationary survey parameter is collected from a first stationary survey location that is located in a borehole undergoing a drilling operation, wherein the borehole is located at a well site, (2) obtaining a set of continuous survey parameters, wherein the set of continuous survey parameters are collected from one or more continuous survey locations between the first stationary survey location and a second stationary survey location, and wherein the set of continuous survey parameters are obtained while the drilling operation remains in progress, (3) receiving a second stationary survey parameter, wherein the second stationary survey parameter is collected from the second stationary survey location, (4) computing a shift parameter, a tilt parameter, and a set of polynomial coefficients using the set of continuous survey parameters, the first stationary survey parameter, and the second station survey parameter, (5) estimating a best fit between the first stationary survey location and the second stationary survey location utilizing the shift parameter, the tilt parameter, the set of polynomial coefficients, and a fitted polynomial, and (6) calculating at least one borehole position parameter utilizing the best fit.

In a second aspect, a survey fusion processor system is disclosed. In one embodiment, the survey fusion processor system includes (1) a survey parameter transceiver, capable of receiving one or more stationary survey parameters, one or more continuous survey parameters, and one or more input parameters for one or more locations in a borehole of a well site, and (2) a survey calculator, capable of computing a shift parameter, a tilt parameter, and a set of polynomial coefficients utilizing the one or more stationary survey parameters, the one or more continuous survey parameters, and the one or more input parameters, estimating a best fit utilizing the shift parameter, the tilt parameter and the set of polynomial coefficients, and calculating a borehole position parameter utilizing the best fit.

In a third aspect, a computer program product having a series of operating instructions stored on a non-transitory computer-readable medium that directs a data processing apparatus when executed thereby to perform operations to determine borehole position parameters from survey parameters is disclosed. In one embodiment, the operations include (1) receiving a first stationary survey parameter, wherein the first stationary survey parameter is collected from a first stationary survey location, wherein the first stationary survey location is located in a borehole undergoing a drilling operation, where the borehole is located at a well site, (2) obtaining a set of continuous survey parameters, wherein the set of continuous survey parameters are collected from one or more continuous survey locations between the first stationary survey location and a second stationary survey location, and wherein the set of continuous survey parameters are obtained while the drilling operation remains in progress, (3) receiving a second stationary survey parameter, wherein the second stationary survey parameter is collected from the second stationary survey location, (4) computing a shift parameter, a tilt parameter, and a set of polynomial coefficients using the set of continuous survey parameters, the first stationary survey parameter, and the second station survey parameter, and (5) estimating a best fit between the first stationary survey location and the second stationary survey location utilizing the shift parameter, the tilt parameter, the set of polynomial coefficients, and a fitted polynomial.

BRIEF DESCRIPTION

Reference is now made to the following descriptions taken in conjunction with the accompanying drawings, in which.

DETAILED DESCRIPTION

Figure 1:
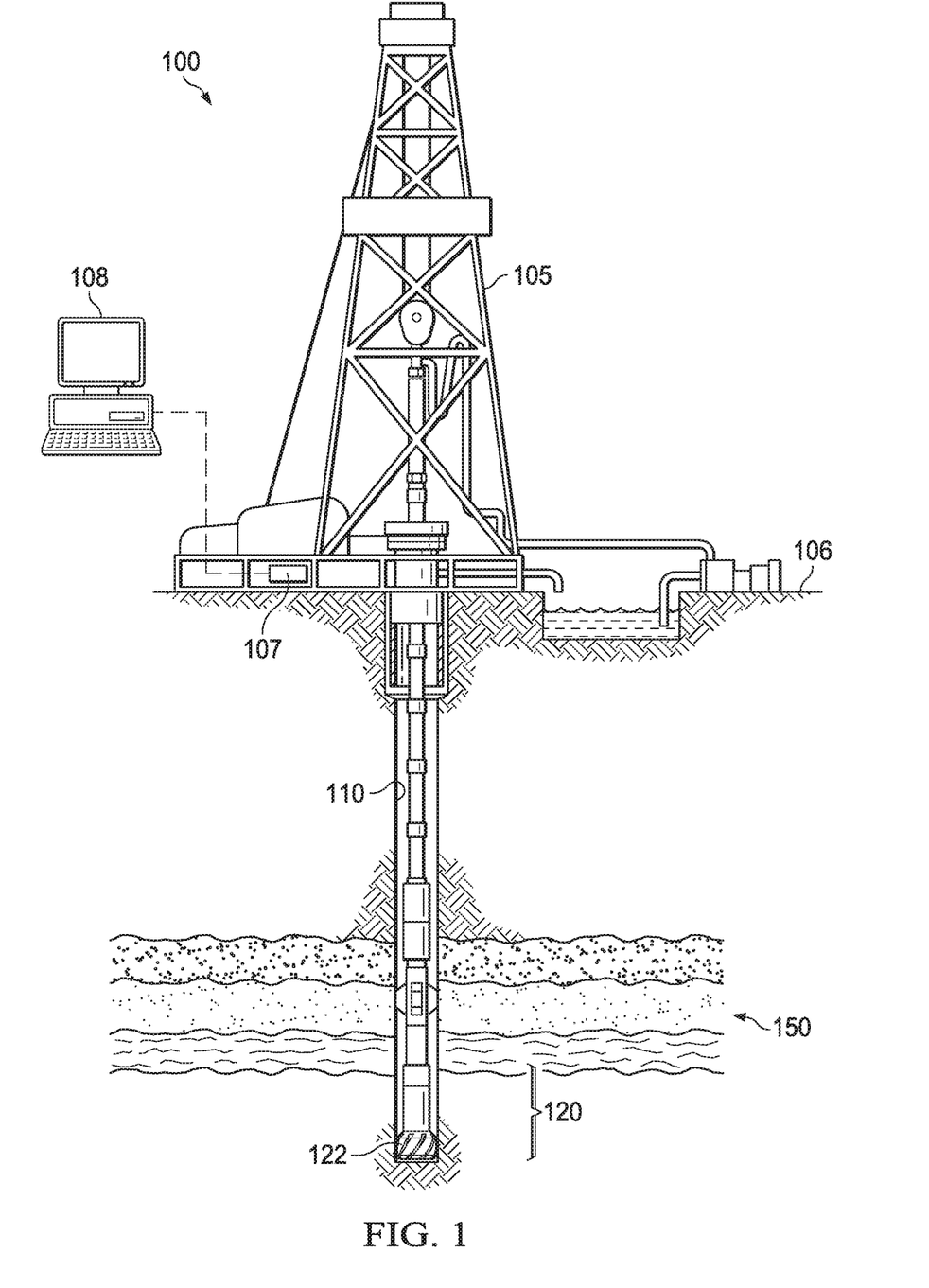
FIG. 1 is an illustration of a diagram of an example drilling well system.
Figure 2:
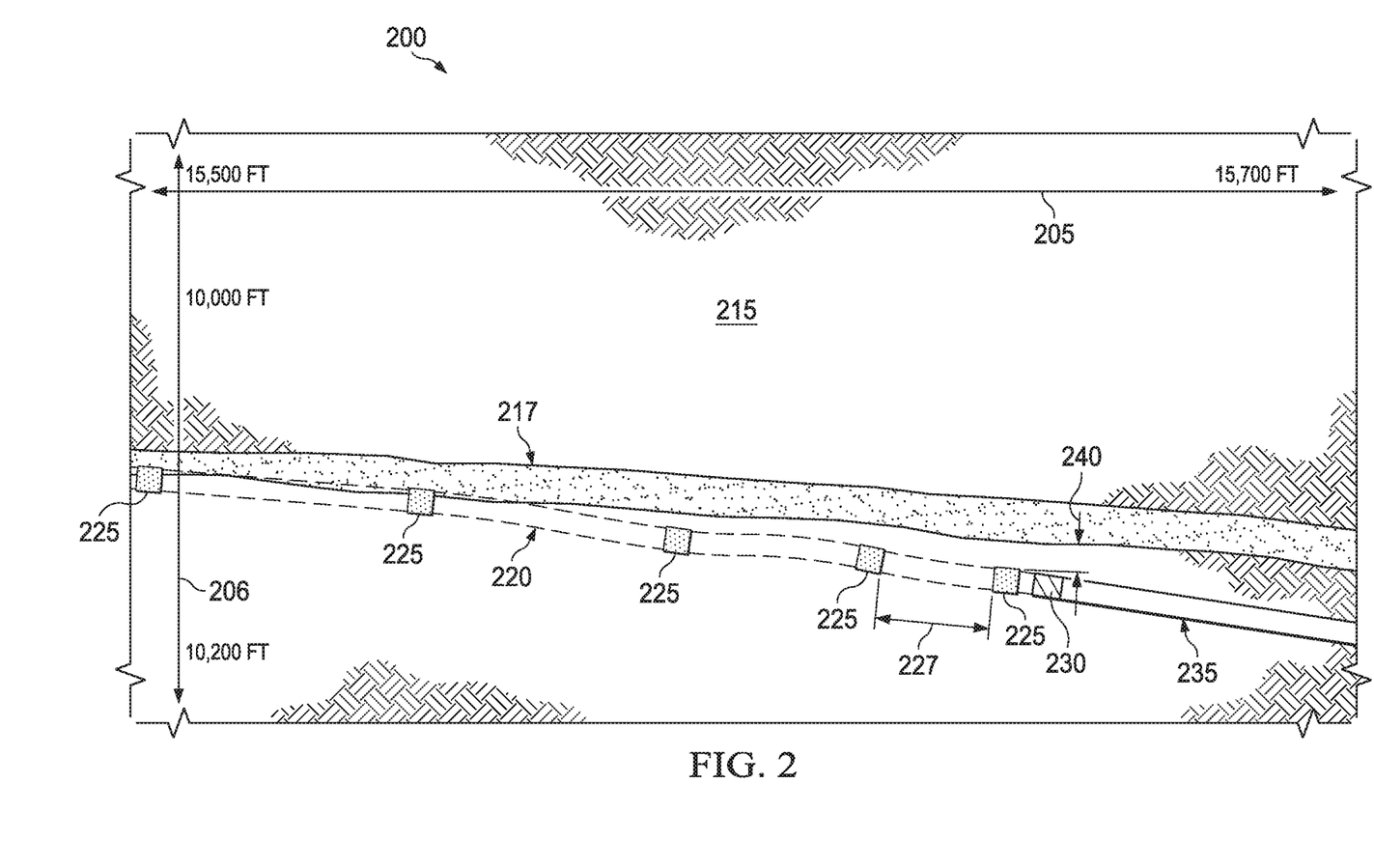
FIG. 2 is an illustration of a diagram of an example borehole relative to a subterranean formation dip.

In the hydrocarbon production industry, users, such as well operators or engineers, use geo-steering techniques to maintain borehole development, e.g., drilling operations, along an intended path and direction, see FIG. 1. As the geological features, e.g., dips, change along a subterranean formation, the direction and depth of the borehole can change to maintain its relative positioning, as shown in FIG. 2. In addition, knowing the position of the borehole relative to nearby boreholes can be beneficial to ensure borehole separation or to ensure borehole intercept at the desired location.

The conventional process utilizes a stationary survey technique to monitor and measure the position of the borehole as it is being drilled. The drilling operations are stopped and then sensors, located proximate the downhole drilling tool, such as a bottom hole assembly (BHA), can take measurements. The drilling operations are stopped to reduce vibration effects on the sensor measurements. The sensors can be one or more of various sensors capable of measuring position information, for example, electromagnetic sensors, acoustic sensors, gamma sensors, temperature sensors, fluid sensors, laser sensors, and other sensor types. The measured information can be processed in a computing system downhole or communicated uphole to a computing system located at a surface location.

Pausing drilling operations, typically for three to ten minutes, can increase drilling time which incurs additional cost in developing and operating the well site. A balance is typically created between maximizing drilling time and the number of stationary survey measurements taken. A smaller measured distance between stationary survey locations can increase the accuracy of the borehole position data as compared to a larger measured distance. It would be beneficial to increase the measured distance between stationary survey locations, thereby decreasing drilling downtime, while maintaining the specified accuracy for positioning the borehole throughout its length.

The position of a borehole can be expressed in terms of the true vertical depth (TVD) and an Eastings and Northings pair parameter, and can be calculated using inclination parameters and azimuth parameters. In some aspects, other coordinate systems can be used in place of the Eastings and Northings pair parameter. Typically, TVD is computed using a minimum curvature method with the stationary survey measurements, which includes an inclination and azimuth parameter, at discrete borehole depths. The distance between the stationary survey locations can vary between thirty to ninety feet, depending on the well plan and operational constraints, though other distance values can be utilized. A constant curvature, e.g., change of inclination and azimuth, is assumed. The TVD error resulting from the assumption can accumulate over multiple survey locations, and can be critical for accurate wellbore placement. The error rate can increase as the inclination approaches 90° (degrees).

This disclosure presents a method to use continuous survey measurements to complement the stationary survey measurements between two stationary survey locations, where the stationary survey measurements are considered the ground truth for the borehole position. The continuous survey measurements between two stationary survey measurements can increase the accuracy of the reported shape of the borehole inclination and azimuth. In aspects where geo-steering techniques are utilized, the reported shape can be used as inputs to the geo-steering service to improve overall performance. In some aspects, the improvement in the reported shape of the borehole can improve the accuracy of tortuosity and micro-dogleg calculations.

When the TVD is calculated using a conventional minimum curvature method, two stationary survey locations are used for the calculations, where they may have a large distance between them, which can introduce errors in the estimations. The disclosed methodology includes continuous survey measurements that are sampled more frequently, e.g., between the two stationary survey locations, and therefore the applied minimum curvature method can result in reduced errors in the calculations for the TVD and the Eastings and Northings pair.

The continuous survey measurements can experience a bias and a drift error in the collected measurements. The continuous survey measurements can be adjusted to compensate for the bias and drift error by shifting and tilting the collected measurements to achieve a best fit to a low order polynomial constrained to pass through the two consecutive stationary survey measurements. This can provide an increase in accuracy of the collected measurements. The low order polynomial coefficients and shift and tilt parameters can be inverted for when the polynomial order is not large and there are a sufficient number of continuous survey measurements between the two stationary survey measurements. If the low order polynomial becomes too large, solving for both the polynomial coefficients and the shift and tilt parameters becomes ill-posed, e.g., the solution may not be unique.

Figure 3A:
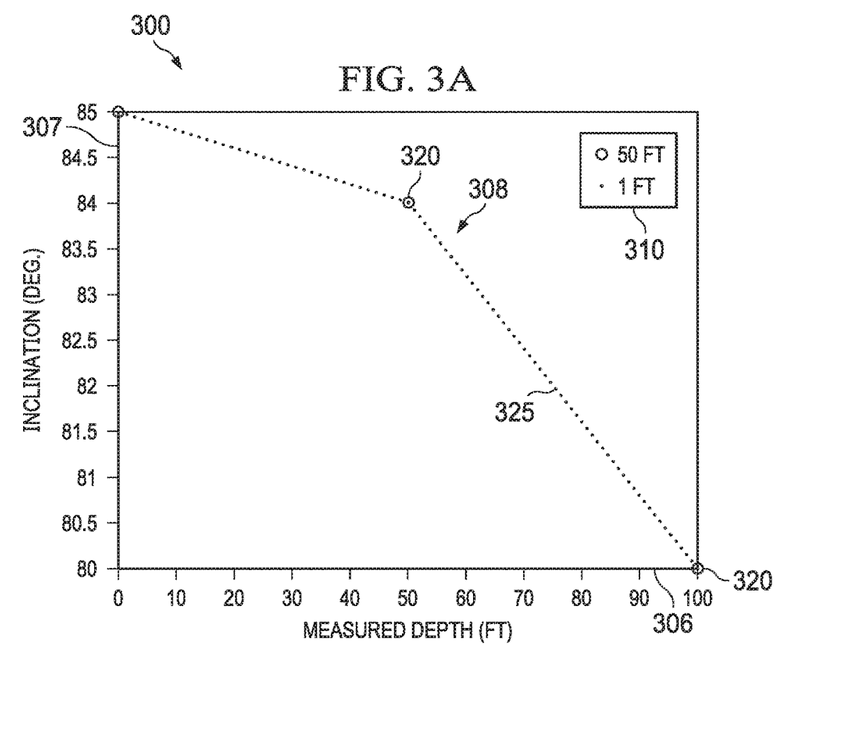
FIG. 3A is an illustration of a chart of an example linear inclination change.

The polynomial order can be considered acceptable if the problem is invertible and available computing resources to resolve the polynomial can perform the operations within a reasonable time interval. The industry standard for computing a minimum curvature utilizes a first order polynomial, such that a line can be fitted to pass through two stationary survey inclination parameters, as shown in FIG. 3A. Polynomials using an order of three or four are considered low order and invertible. Typically, a polynomial order of ten or higher can be considered too large. The sufficient number of continuous survey measurements can be, for example, ten to one hundred measurements between the stationary survey locations, while a greater or lesser number of measurements can be utilized.

In some aspects, the TVD can be calculated by integrating stationary survey inclination and azimuth measurements over the measured depth, assuming a minimum curvature, e.g., inclination and azimuth vary linearly between the set of survey locations. In this aspect, if the minimum curvature assumption is valid, a minimal error can occur from integrating the low data rate stationary survey. An inclination measurement, as shown in FIG. 3A, does not vary between a stationary survey station measurement and a continuous measurement. A similar consistency is shown for the TVD in FIG. 3B.

Figure 4A:
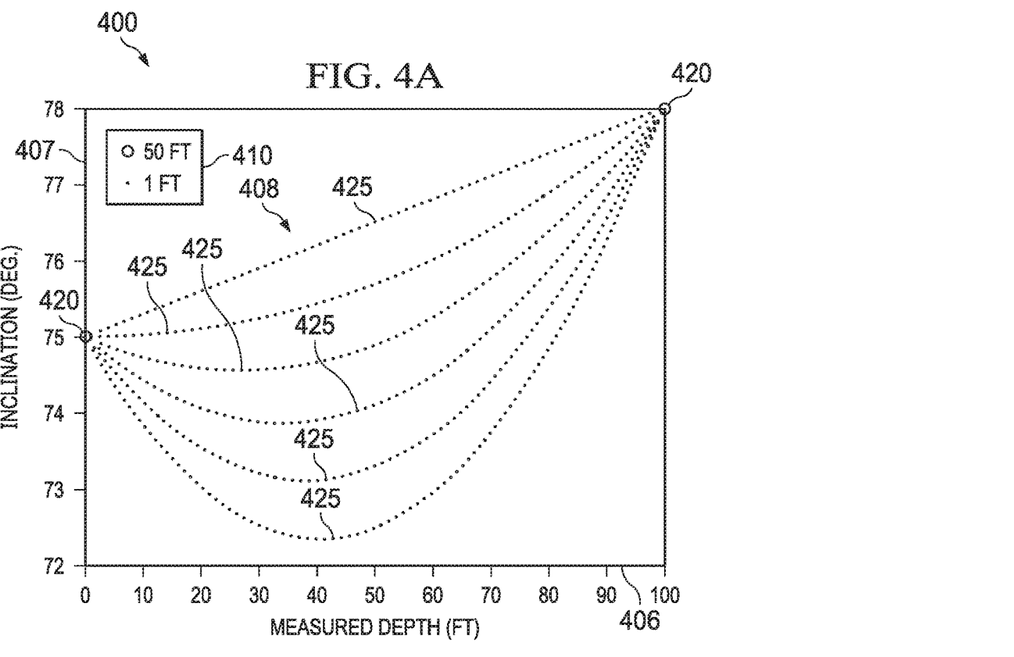
FIG. 4A is an illustration of a chart of example non-linear inclination changes.
Figure 4B:
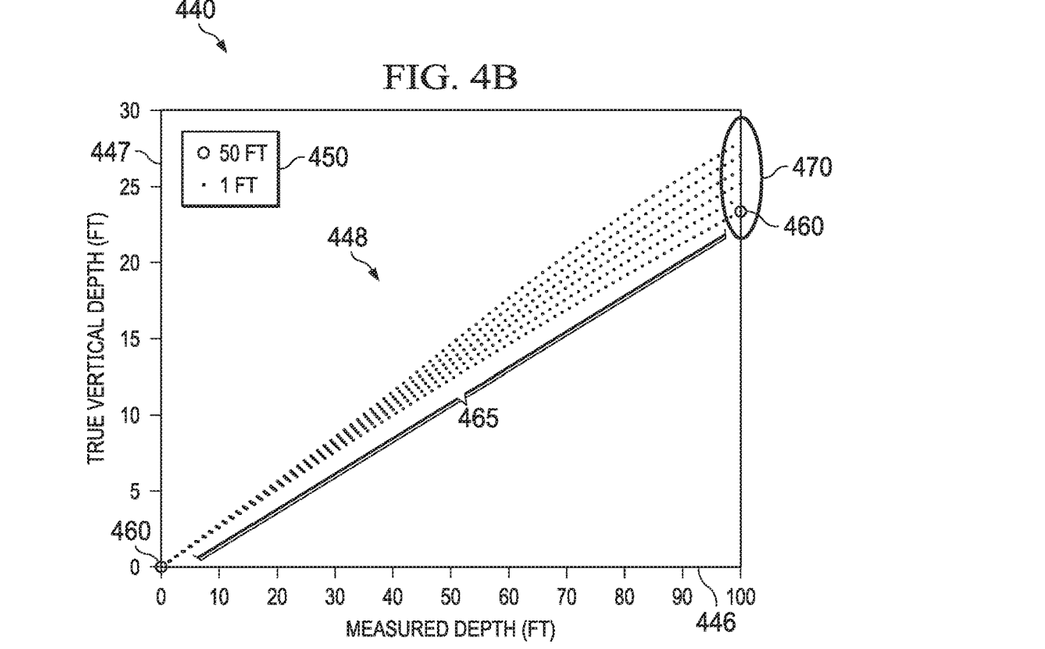
FIG. 4B is an illustration of a chart of example TVD changes using the inclinations of FIG. 4A.

In aspects where the inclination and azimuth do not vary linearly between the stationary survey locations, then integrating the stationary survey locations over a measured depth assuming a minimum curvature generates errors, as shown in FIG. 4A for inclination computations and FIG. 4B for TVD computations. The error increases as the inclination increases, e.g., approaches a horizontal orientation of 90°. In this example, 4° of quadratic variation in the inclination between two stationary survey locations separated by 100 feet of measured depth, at an inclination of 75°, can generate approximately 4.5 feet of error in the TVD calculation.

The disclosed method fuses the stationary survey measurements with continuous survey measurements collected while drilling operations remain in progress to generate a higher data rate pseudo-stationary survey for computing TVD. The continuous survey measurements, e.g., high data rate, for the inclination and azimuth between two stationary survey locations can, after being corrected for bias and drift error using the bias and tilt parameters, approximately describe an accurate shape of the respective inclination and azimuth curves between the ground truth stationary survey locations. High data rate pseudo-stationary survey measurements can be computed by shifting and tilting the collected high data rate data measurements, thus compensating for the bias and drift error, which then can be further used to generate a best fit to a low order polynomial constrained to pass through the two ground truth stationary survey locations. The best fit problem can be invertible if the polynomial order is not too large and there are a sufficient number of data points.

An algorithm that can be utilized with this disclosure can be described as shown in Equation 1.

Example low order polynomial defining a high data rate pseudo-stationary survey $$f_n = \sum_{k=0}^{K} a_k (d_n - \bar{d})^k \quad \text{Equation 1}$$

where n is the index of the survey measurements, wherein n=1 and n=N correspond to the stationary survey locations bounding the interval of continuous survey measurements indexed from n=2 to n=N−1, where N is the total number of continuous survey locations plus the two stationary survey locations, $d_n$ is the measured depth at each continuous, e.g., n=2 to n=N−1, or stationary, e.g., n=1 or n=N, survey location, k is the power of each respective polynomial term, up to the $K^{th}$ order, $\bar{d}$ is the average of the measured depths in the interval, and $a_k$ is the coefficient for each respective polynomial term.

The collected continuous survey measurements can be shifted or tilted to compensate for the bias and drift in the measurements. The shifting and tilting algorithm is shown in Equation 2.

$$f_n \approx s_n + \alpha + \beta(d_n - \bar{d}), \quad \text{Equation 2: Example shift and tilt corrections to collected measurements}$$

where $s_n$ is the collected inclination or azimuth continuous survey measurements recorded while drilling, (n=2 to n=N−1), α is the shift for the continuous survey measurements that compensates for the bias, and β is the tilt for the continuous survey measurements that compensates for the drift.

Since the stationary survey measurements, defined as $s_1$ and $s_N$, are considered ground truth, the boundary constraints can be applied as $s_1 = f_1$ and $s_N = f_N$ which allows for the elimination k of the terms $a_0$ and $a_1$. More precisely, Equation 1 can be shown as $s_1 = f_1 = \Sigma_{k=0}^{K} a_k (d_1 - \bar{d})^k$ and $s_N = f_N = \Sigma_{k=0}^{K} a_k (d_N - \bar{d})^k$ and can be algebraically solved for do and a in terms of the remaining unknown coefficients $a_2, \ldots, a_K$ and the known values $s_1, s_N, d_1, d_N,$ and $\bar{d}$. The remaining unknowns, α, β, and $a_2, \ldots, a_K$, can be estimated by finding a best fit between the low order polynomial and the shifted and tilted continuous survey measurements for the inclination or azimuth. In other words, minimizing the difference between the left and right sides of Equation 2 for n=2, . . . . N−1. Multiple approaches are available to determine the best fit. For example, the best fit can be determined by optimizing an objective function, such as minimizing an L2 norm objective function as shown in Equation 3.

Example objective function to determine a best fit $$O = \sum_{n=2}^{N-1} \left[ \left\{ \sum_{k=0}^{K} a_k (d_n - \bar{d})^k \right\} - (s_n + \alpha + \beta(d_n - \bar{d})) \right]^2 + \varepsilon \sum_{n,m=1}^{N} \left[ S_{nm} - \sum_{k=0}^{K} a_k \left( (d_n - \bar{d})^k - (d_m - \bar{d})^k \right) \right]^2 \quad \text{Equation 3}$$

where ε is a user defined small weight to prevent overfitting by suppressing measurement noise, $S_n$ and $S_m$ are an inclination or azimuth values at depth $d_n$ on the straight, i.e., minimum curvature, line connecting the stationary survey locations $(d_1, s_1)$ and $(d_N, s_N)$, (n, m) are measured depth indices (or, alternatively, azimuth indices) at continuous (n=2 to n=N−1 and m=2 to m=N−1) or stationary (n=1 or n=N, and m=1 or m=N) survey locations, and $S_{nm} = S_n - S_m$.

The first term of the objective function is the sum of the squared difference between the left and right hand sides of Equation 2 for n=2, . . . . N−1, i.e., the shifted and tilted continuous survey measurements, for either the inclination or the azimuth, and the polynomial. Note the objective function as expressed in Equation 3 uses all of the polynomial coefficients including $a_O$ and $a_L$. This was done to make the objective function expression cleaner and easier to understand. In practice the terms $a_O$ and $a_L$ are replaced by their equivalent algebraic expressions in terms of the remaining coefficient unknowns $a_2, \ldots, a_K$ and the known values $s_1, s_N, d_1, d_N,$ and $\bar{d}$ derived from algebraically solving the modified Equation 1. The second term of the objective function is a flattening cost function to reduce the effect of measurement noise. The user defined small weight (noise reduction parameter), ε, is defined such that an infinite value results in a straight line and a value of zero applies no noise correction. The value can vary according to the conditions experienced in the borehole and surrounding subterranean formation. A typical value for & can be 0.01 which provides for some noise suppression of the collected continuous survey measurements.

The objective function as described in Equation 3 can be used to derive a matrix equation as shown in Equation 4. The matrix equation can be derived by setting the partial derivatives of the objective function with respect to the components of the solution vector to zero, following conventional optimization techniques.

Example matrix equation for minimizing Equation 3

$$M \begin{bmatrix} \alpha \\ \beta \\ a_2 \\ \vdots \\ a_K \end{bmatrix} = \vec{b} \quad \text{Equation 4}$$

where M and b are known expressions in terms of $\{d_n\}$ and $\{s_n\}$ derived by setting the partial derivatives of the objective function with respect to the components of the solution vector, $[\alpha \; \beta \; a_2 \; \ldots \; a_K]^T$ to zero as noted previously.

Figure 5:
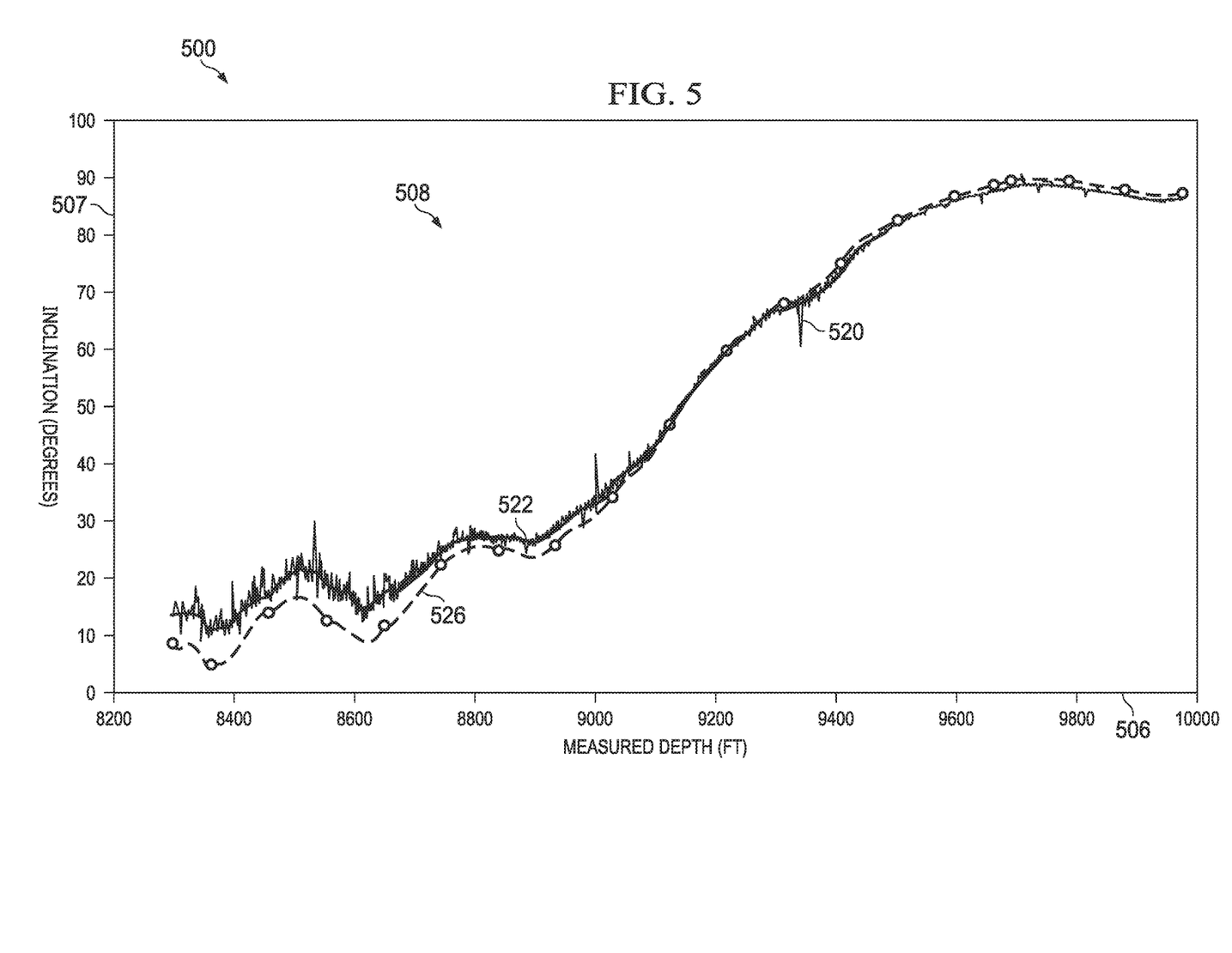
FIG. 5 is an illustration of a chart of an example polynomial fusion with stationary survey locations.

The output of minimizing Equation 3 numerically by trial and error substitution, or equivalently solving Equation 4 can be a solution vector that is applied to one or more of the Cartesian (x, y, z) coordinates of the borehole to provide an estimation of the location of the borehole to users or systems, such as a well site controller, a geo-steering system, or other well site system, as shown in FIG. 5. When an inclination is evaluated, the vertical (z), e.g., TVD, parameter can be adjusted. TVD is not to be confused with measured depth (depth along the drilling path). When an azimuth parameter is evaluated, an Eastings and Northings pair, e.g., the horizontal plane (x, y), can be adjusted. In some aspects, the TVD or Eastings and Northings pair can be interpolated to the continuous survey measurements using a standard interpolation algorithm, such as a linear algorithm, a spline algorithm, p-chip algorithm, or other interpolation algorithms. In some aspects, the best fit polynomial can be determined using a machine learning technique, such as a linear algorithm, a logistic regression algorithm, a decision tree algorithm, a random forest algorithm, or other supervised learning algorithms. In some aspects, an objective function can numerically minimize the absolute value of the difference between the polynomial and the data.

Turning now to the figures, FIG. 1 is an illustration of a diagram of an example drilling well system 100 using a borehole position system to track the borehole position as it is being drilled. Drilling well system 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well or an intercept well. Drilling well system 100 includes a derrick 105, a well site controller 107, and a computing system 108. Well site controller 107 includes a processor and a memory and is configured to direct operation of well system 100. Derrick 105 is located at a surface 106.

Extending below derrick 105 is a borehole 110 with downhole tools 120 at the end of a drill string. Downhole tools 120 can include various downhole tools and bottom hole assemblies (BHA), such as drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, and other information, including stationary survey location parameters and continuous survey parameters. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the process and methods described herein. Well site operators, engineers, and other personnel can send and receive data, instructions, measurements, and other information by various conventional means with computing system 108 or well site controller 107.

Well site controller 107 or computing system 108 can receive the stationary survey location parameters and the continuous survey parameters and perform the methods and processes disclosed herein. The results of the calculations, e.g., borehole position parameters, can be communicated to a drilling operations system, a geo-steering system, or other well site system or user where the results can be used as inputs to direct further drilling operations. In some aspects, computing system 108 can be located with downhole tools 120 and the computations can be completed at the downhole location. The results can be communicated to a drilling system or to a drilling operation system downhole or at a surface location.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

FIG. 2 is an illustration of a diagram of an example borehole environment 200 relative to a subterranean formation 215. Subterranean formation 215 is located, for example, at a measured depth 205 between approximately 15,500 feet to 15,700 feet and a TVD 206 between approximately 10,000 feet and 10,200 feet. Subterranean formation 215 has a dip 217 (shown as dark bands) to which a borehole 220 should maintain a specified distance. As dip 217 angles down to the right, the drilling of borehole 220 should mimic the downward angle to maintain the specified separation distance. Stationary survey locations 225 (shown as a solid black squares along borehole 220) are the locations where image log data, e.g., TVD and Eastings and Northings pair parameters, have been collected. The image log data can be used in conjunction with offset geology logs to determine adjustments to the drilling or geo-steering process.

At the end of borehole 220 is a downhole tool 230 (shown as a striped rectangle) including a drilling tool, e.g., drill bit. A projected drill path 235 (shown as an outline rectangle) shows the current projected path of borehole 220 if further drilling or geo-steering adjustments are not made. A bracket 240 is highlighting an approximate depth difference between borehole 220 and dip 217. The disclosed method, algorithms, and processes can utilize two neighboring stationary survey locations 225 and continuous survey parameters collected between the stationary survey locations 225 to calculate the TVD and Eastings and Northings pair parameters for the borehole location. For example, continuous survey measurements 227, in conjunction with two neighboring stationary survey locations 225 can be used to determine the current position of downhole tool 230.

FIG. 3A is an illustration of a chart of an example linear inclination change 300, that demonstrates minimal differences between stationary survey measurements and continuous survey measurements when the borehole is drilled linearly. Linear inclination change 300 includes an x-axis 306 indicating the measured depth in feet, a y-axis 307 indicating an inclination of the borehole in degrees, and a plot area 308.

Plot area 308 includes a reference key 310 indicating that the open circle shows the stationary survey measurements using a stationary distance interval of 50 feet, and the point shows the continuous survey measurements using a continuous distance interval of one foot. Stationary survey measurements 320 are plotted on linear inclination change 300. Continuous survey measurements 325 are plotted on linear inclination change 300 as well. When the borehole inclination changes linearly, the stationary survey measurements 320 can be utilized to determine the borehole position, e.g., there is minimal error.

Figure 3B:
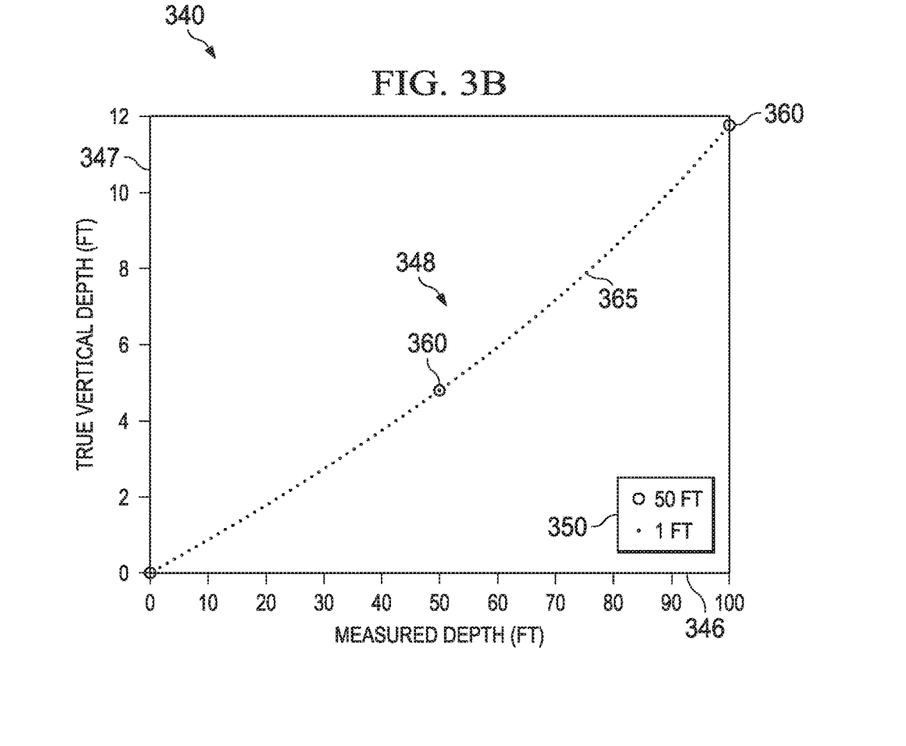
FIG. 3B is an illustration of a chart of an example true vertical depth (TVD) change using the inclination of FIG. 3A.

FIG. 3B is an illustration of a chart of an example true vertical depth (TVD) change 340 using the inclination of FIG. 3A. TVD change 340 includes an x-axis 346 indicating the measured depth in feet, a y-axis 347 indicating a TVD of the borehole in feet, and a plot area 348.

Plot area 348 includes a reference key 350 indicating that the open circle shows the stationary survey measurements using a stationary distance interval of 50 feet, and the point shows the continuous survey measurement using a continuous distance interval of one foot. Stationary survey measurements 360 are plotted on TVD change 340. Continuous survey measurements 365 are plotted on TVD change 340 as well. When the borehole inclination changes linearly, the TVD as derived from stationary survey measurements 360 can be utilized to determine the borehole position, e.g., there is minimal error.

FIG. 4A is an illustration of a chart of example non-linear inclination change 400, that demonstrates significant differences between stationary survey measurements and continuous survey measurements when the borehole is drilled following a non-linear path. Non-linear inclination change 400 includes an x-axis 406 indicating the measured depth in feet, a y-axis 407 indicating an inclination of the borehole in degrees, and a plot area 408.

Plot area 408 includes a reference key 410 indicating that the open circle shows the stationary survey measurements using a stationary distance interval of 50 feet, and the point shows the continuous survey measurements using a continuous distance interval of one foot. Stationary survey measurements 420 are plotted on non-linear inclination change 400. Continuous survey measurements 425 are plotted on non-linear inclination change 400 as well. Each set of continuous survey measurements 425 (a set is shown as a continuous curve of continuous survey measurements) demonstrates a different inclination change profile, e.g., differing changes in inclination, as the borehole is drilled from the first of stationary survey measurements 420 to the second of stationary survey measurements 420. Bias and drift parameters for each of the sets of continuous survey measurements 425 can be introduced and affect the final calculation of the TVD for the borehole. The bias and drift can result in error in the TVD calculation.

FIG. 4B is an illustration of a chart of example TVD change 440 using the inclinations of FIG. 4A. TVD change 440 includes an x-axis 446 indicating the measured depth in feet, a y-axis 447 indicating a TVD of the borehole in feet, and a plot area 448.

Plot area 448 includes a reference key 450 indicating that the open circle shows the stationary survey measurements using a stationary distance interval of 50 feet, and the point shows the continuous survey measurements using a continuous distance interval of one foot. Stationary survey measurements 460 are plotted on TVD change 440. Each set of continuous survey measurements 465 are plotted on TVD change 440 as well. When the borehole inclination changes non-linearly, the TVD as derived from stationary survey measurements 460 can have reduced accuracy in representing the actual TVD due to the bias and drift parameters of the set of continuous survey measurements 465. Each set of continuous survey locations 465 demonstrates respective errors in TVD at the downhole stationary survey point, as shown by the end point spacing 470. The error increases as the inclination increases, e.g., approaches a horizontal orientation of 90°. In this example, 4° of quadratic variation in the inclination between two stationary survey locations separated by 100 feet of measured depth, at an inclination of 75°, can generate approximately 4.5 feet of error in the TVD calculation.

FIG. 5 is an illustration of a chart of an example polynomial fusion 500 with stationary survey measurements. Polynomial fusion 500 demonstrates that bias and drift parameters can be compensated and each iteration of the calculation of the TVD can be corrected to generate a higher accuracy TVD. Polynomial fusion 500 includes an x-axis 506 indicating the measured depth in feet, a y-axis 507 indicating an inclination of the borehole in degrees, and a plot area 508.

In plot area 508, stationary survey measurements 526 are plotted on polynomial fusion 500 and connected by a curve. Continuous survey measurements 520 are also plotted on polynomial fusion 500. Continuous survey measurements 520 can be pre-filtered with a median filter to smooth the data. The resulting smoothed data is shown by curve 522. A fourth order polynomial, using an $\varepsilon=0.01$, is applied to curve 522 to reduce noise in the continuous survey measurements.

Polynomial fusion 500 is shown as a chart for demonstration purposes. The methods, algorithms, and processes disclosed herein can be implemented without a chart or graphing component, such as being implemented in an application or software component. References to best fit curves or minimum curvatures in this disclosure are for demonstration purposes, and can be implemented using algorithms internal to the implemented processes, and physical curves do not need to be graphed or plotted.

Figure 6:
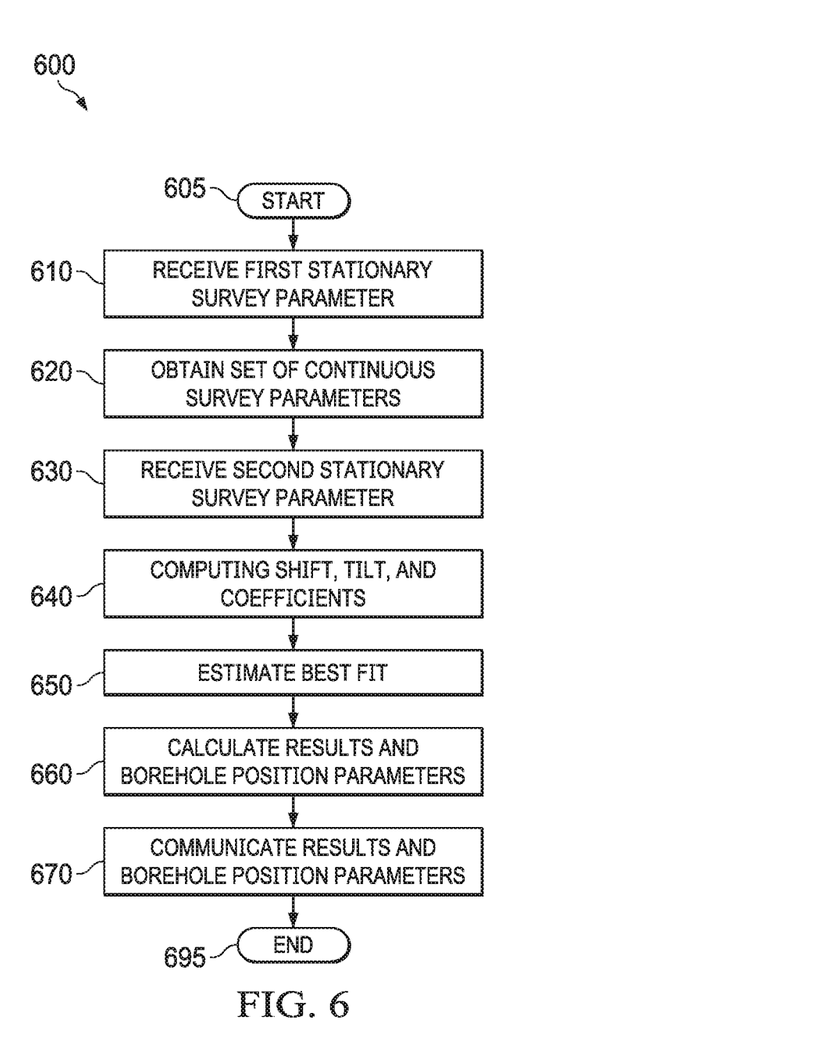
FIG. 6 is an illustration of a flow diagram of an example method to calculate a TVD and an Easting and Northings pair.

FIG. 6A is an illustration of a flow diagram of an example method 600 to calculate a TVD and an Eastings and Northings pair. Method 600 can be performed on a computing system, such as a well site controller, a geo-steering system, a BHA, or other computing system capable of receiving the various survey parameters and inputs, and capable of communicating with equipment or a user at a well site. Other computing systems can be a smartphone, PDA, laptop computer, desktop computer, server, data center, cloud environment, or other computing system. Method 600 can be encapsulated in software code or in hardware, for example, an application, code library, dynamic link library, module, function, RAM, ROM, and other software and hardware implementations. The software can be stored in a file, database, or other computing system storage mechanism. Method 600 can be partially implemented in software and partially in hardware.

Method 600 starts at a step 605 and proceeds to a step 610. In step 610 the process can receive the first stationary survey parameter. This parameter is collected by one or more sensors located downhole, proximate the drilling system. The drilling operations are paused while the sensor measurements are collected to minimize vibration and other disturbances in the measurements. The measurements can then be provided to the disclosed process as the stationary survey parameters.

Proceeding to a step 620, drilling operations can resume, and over the course of the next stationary distance interval, such as 30 feet or 90 feet, though other distance intervals can be used, continuous survey parameters are collected. The continuous survey parameters are collected by sensors located proximate the drilling system, for example, the same sensors used to collect the stationary survey parameters. Drilling operations remain in progress during the sensor measurement process. Therefore, the continuous survey parameters can have bias and drift affects altering the parameters. The continuous survey parameters are obtained at a continuous distance interval until the subsequent stationary survey location is reached, e.g., the drilling operation has progressed by the stationary distance interval. The number of continuous survey parameters obtained can vary, such as from 10 to 100, and other counts can be used.

In some aspects, there may be fewer continuous survey parameters than desired. An interpolation can be utilized to generate a specified minimum number of survey parameters in the set of continuous survey parameters using one of a linear algorithm, a spline algorithm, or a p-chip algorithm, and wherein the first stationary survey parameter and the second stationary survey parameter are utilized with the set of continuous survey parameters in the interpolation algorithm.

Proceeding to a step 630, the second stationary survey parameter can be received from sensors, as described in step 610. The first stationary survey parameter, the second stationary survey parameter, and the continuous survey parameters can include one or more of inclination parameters, azimuth parameters, tortuosity parameters, and micro-dogleg parameters.

Proceeding to a step 640, the received and obtained parameters are utilized in a polynomial fusion equation, for example as shown in Equation 1 and Equation 2, to determine calculations for a shift parameter (to compensate for the bias parameter in the continuous survey parameters), a tilt parameter (to compensate for the drift parameter in the continuous survey parameters), and polynomial coefficients for each term of the low order polynomial. In some aspects, a pre-filter can be applied to the continuous survey parameters to reduce noise.

Proceeding to a step 650, a best fit can be estimated to solve for the low order polynomial, e.g., fitted polynomial, and unknown variables. In some aspects, a flattening cost function can be applied as well to reduce noise in the continuous survey parameters. The best fit can be derived using an objective function, such as shown in Equation 3. In some aspects, the estimating can utilize one or more of a linear algorithm, a logistic regression algorithm, a decision tree algorithm, a random forest algorithm, or a machine learning algorithm. In some aspects the estimating utilizes a minimized absolute value of the difference between the fitted polynomial, and the shift parameter, tilt parameter, and polynomial coefficients.

Proceeding to a step 660, the output, e.g., polynomial solution, of step 650 can be utilized to generate one or more results, such as inclination parameters and azimuth parameters. Applying a minimum curvature algorithm between the neighboring survey locations, where the survey locations are of any type, and utilizing the inclination parameters and azimuth parameters, further derivations and borehole position parameters can be calculated, such as a TVD parameter, an Eastings and Northings pair parameter, a tortuosity parameter, or a micro-dogleg parameter. In a step 670, the borehole position parameters can be communicated to another system, for example, a well site controller, a geo-steering system, a BHA, a drilling system, a user, or other computing system supporting the well site. Method 600 ends at a step 695.

Figure 7:
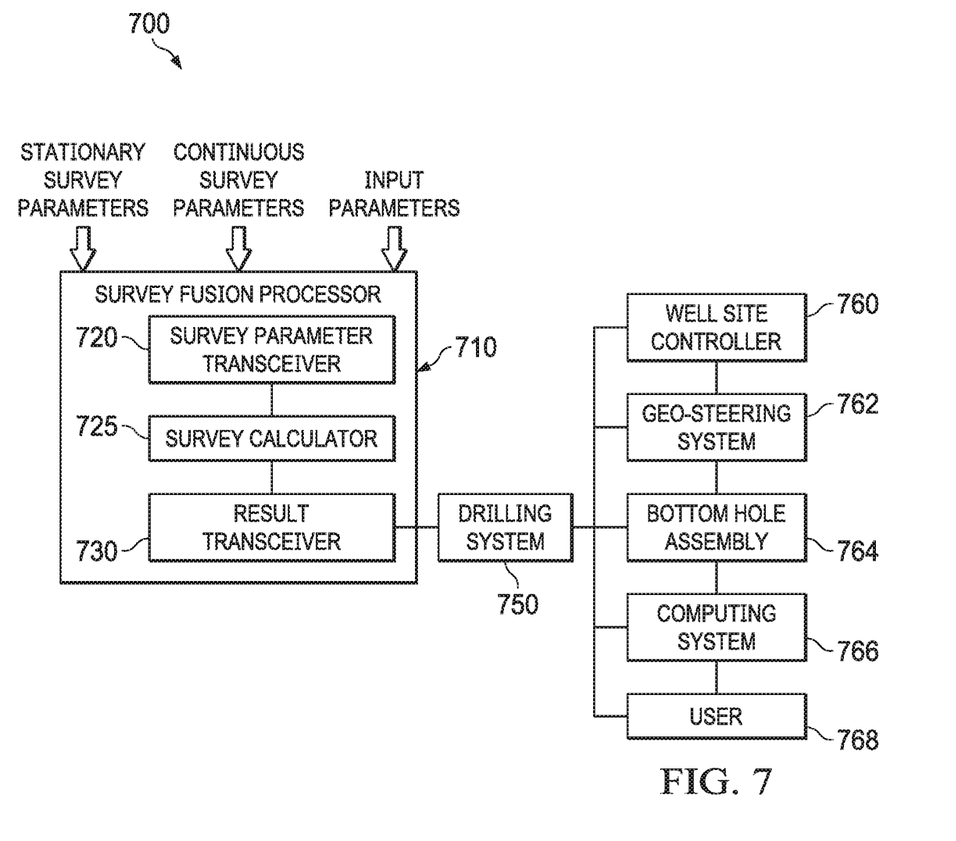
FIG. 7 is an illustration of a block diagram of an example borehole position system.

FIG. 7 is an illustration of a block diagram of an example borehole position system 700, which can be implemented in one or more computing systems, for example, a well site controller, a reservoir controller, a data center, cloud environment, server, laptop, smartphone, tablet, and other computing systems. The computing system can be located proximate the well site, or a distance from the well site, such as in a data center, cloud environment, or corporate location. The computing system can be a distributed system having a portion located proximate the well site and a portion located remotely from the well site. Borehole position system 700, or a portion thereof, can be implemented as an application, a code library, dynamic link library, function, module, other software implementation, or combinations thereof. In some aspects, borehole position system 700 can be implemented in hardware, such as a ROM, a graphics processing unit, or other hardware implementation. In some aspects, borehole position system 700 can be implemented partially as a software application and partially as a hardware implementation.

Borehole position system 700 includes a survey fusion processor 710 which further includes a survey parameter transceiver 720, a survey calculator 725, and a result transceiver 730. Survey parameter transceiver 720 can receive stationary survey parameters, continuous survey parameters, and input parameters. The input parameters can be parameters, instructions, directions, data, and other information to enable or direct the remaining processing of borehole position system 700. For example, the input parameters can include a stationary distance interval, a continuous distance interval, a specified minimum number of continuous survey locations, an algorithm to utilize, an output system to receive the borehole position parameters, and other input parameters.

Survey parameter transceiver 720 can receive the stationary survey parameters and continuous survey parameters from one or more sensors located proximate the drilling system or located elsewhere in the borehole or at a surface location. In some aspects, survey parameter transceiver 720 can receive the various parameters from a computing system, for example, when a controller or computing system collects the parameters from the sensors and then communicates the parameters to survey parameter transceiver 720. The sensors can collect measurements from the surrounding subterranean formation. The measurements can be transformed into survey parameters by the sensors, survey parameter transceiver 720, or another computing system.

Result transceiver 730 can communicate one or more calculated results and borehole positions, e.g., result parameters and borehole position parameters, to one or more other systems, such as a geo-steering system, a geo-steering controller, a well site controller, a computing system, a BHA, drilling system, a user, or other well related systems. Other well related systems can include a computing system where survey fusion processor 710 is executing or be located in another computing system proximate or distal from survey fusion processor 710. Survey parameter transceiver 720 and result transceiver 730 can be, or can include, conventional interfaces configured for transmitting and receiving data.

Survey calculator 725 can implement the analysis, equations, and algorithms as described herein utilizing the stationary survey parameters, continuous survey parameters, and input parameters to determine the parameters, such as TVD or Eastings and Northings pair parameters. Survey calculator 725 can determine the shift parameter and tilt parameter using the bias parameter and drift parameter, and then utilize an algorithm, such as an optimized objective function, to solve the low order polynomial, and the shift and the tilt parameters. Survey calculator 725 can use one or more algorithms, such as machine learning, decision tree, random forest, logistic regression, linear, and other algorithms to determine the borehole position parameters. In some aspects, survey calculator 725 can interpolate the continuous survey parameters if additional continuous survey parameters are desired, such as if there are less than a specified number of continuous survey parameters. Various interpolation algorithms can be utilized, such as linear, spline, p-chip, or other interpolation algorithms.

A memory or data storage of survey calculator 725 or survey fusion processor 710 can be configured to store the processes and algorithms for directing the operation of survey calculator 725.

The borehole position parameters from survey fusion processor 710 can be communicated to another system, such as drilling system 750. Drilling system 750 can be represented by one or more of a well site controller 760, a geo-steering system 762, a BHA 764, a computing system 766, or a user 768. The borehole position parameters can be used to ensure the borehole is being drilled per the well site operation plan or is otherwise proceeding along the intended drilling path.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method, comprising:
   receiving a first stationary survey parameter, wherein the first stationary survey parameter is collected from a first stationary survey location that is located in a borehole undergoing a drilling operation, wherein the borehole is located at a well site;
   obtaining a set of continuous survey parameters, wherein the set of continuous survey parameters are collected from one or more continuous survey locations between the first stationary survey location and a second stationary survey location, and wherein the set of continuous survey parameters are obtained while the drilling operation remains in progress;
   receiving a second stationary survey parameter, wherein the second stationary survey parameter is collected from the second stationary survey location;
   computing a shift parameter and a tilt parameter for at least one continuous survey parameter in the set of continuous survey parameters, and a set of polynomial coefficients for a low order polynomial using the set of continuous survey parameters, the first stationary survey parameter, and the second station survey parameter;
   generating a best fit for an intended borehole path using the low order polynomial by applying the shift parameter, the tilt parameter, and the set of polynomial coefficients as constraints to the low order polynomial wherein the best fit is constrained by the first stationary survey location and the second stationary survey location;
   calculating at least one borehole position parameter relative to the first stationary survey location or relative to the second stationary survey location utilizing the best fit; and
   adjusting a drilling angle of a drill bit within the borehole to maintain an intended drilling path utilizing the at least one borehole position parameter.

2. The method as recited in claim 1, further comprising: communicating the borehole position parameter to one or more of a user, a well site controller, or a geo-steering system proximate the well site.

3. The method as recited in claim 1, wherein the computing utilizes a pre-filter on the set of continuous survey parameters.

4. The method as recited in claim 1, wherein the first stationary survey parameter, the second stationary survey parameter, and the set of continuous survey parameters are one or more of an inclination parameter or an azimuth parameter.

5. The method as recited in claim 1, wherein the borehole position parameter includes one or more of a true vertical depth parameter, an Eastings and Northings pair parameter, a tortuosity parameter, or a micro-dogleg parameter.

6. The method as recited in claim 1, wherein the generating utilizes an objective function.

7. The method as recited in claim 1, wherein the low order polynomial is of an order of 5 or less.

8. The method as recited in claim 1, wherein the generating utilizes a flattening cost function.

9. The method as recited in claim 1, wherein the set of continuous survey parameters are interpolated to generate a specified minimum of survey parameters in the set of continuous survey parameters using one of a linear algorithm, a spline algorithm, or a p-chip algorithm, and wherein the first stationary survey parameter and the second stationary survey parameter are utilized with the set of continuous survey parameters.

10. The method as recited in claim 1, wherein the generating utilizes one or more of a linear algorithm, a logistic regression algorithm, a decision tree algorithm, a random forest algorithm, or a machine learning algorithm.

11. The method as recited in claim 1, wherein the generating utilizes a minimized absolute value of a difference between the polynomial, and the shift parameter, the tilt parameter, and the set of polynomial coefficients.

12. A survey fusion processor system, comprising:
a survey parameter transceiver, capable of receiving one or more stationary survey parameters, one or more continuous survey parameters, and one or more input parameters for one or more locations in a borehole of a well site; and
a survey calculator, capable of computing a shift parameter and a tilt parameter for at least one continuous survey parameter in the one or more continuous survey parameters, and a set of polynomial coefficients for a low order polynomial utilizing the one or more stationary survey parameters, the one or more continuous survey parameters, and the one or more input parameters, wherein the shift parameter, the tilt parameter, the set of polynomial coefficients, and the low order polynomial are used to generate a best fit for an intended borehole path, where the best fit is constrained by the first stationary survey location and the second stationary survey location, and calculating a borehole position parameter relative to one of the one or more stationary survey parameters utilizing the best fit, wherein the at least one borehole position parameter is utilized to adjust a drilling angle of a drill bit within the borehole to maintain an intended drilling path of the borehole.

13. The survey fusion processor system as recited in claim 12, further comprising:
a result transceiver, capable of communicating the borehole position parameter; and
wherein a drilling system is capable of receiving the borehole position parameter and directing operations of a drilling operation, wherein the drilling system is part of a well site controller, a geo-steering system, or a bottom hole assembly (BHA).

14. The survey fusion processor system as recited in claim 13, wherein the survey parameter transceiver, the survey calculator, and the result transceiver are included with the well site controller, the geo-steering system, or the BHA.

15. The survey fusion processor system as recited in claim 12, wherein the borehole position parameter is one or more of an inclination parameter, an azimuth parameter, a true vertical depth parameter, a Eastings and Northings pair parameter, a tortuosity parameter, or a micro-dogleg parameter.

16. The survey fusion processor system as recited in claim 12, wherein the survey calculator is further capable of applying a filter to the stationary survey parameters or the continuous survey parameters, and reducing measurement noise by applying a noise reduction parameter.

17. The survey fusion processor system as recited in claim 12, wherein the survey calculator is further capable of interpolating the stationary survey parameters and the continuous survey parameters to generate a received specified minimum number of continuous survey parameters.

18. A computer program product having a series of operating instructions stored on a non-transitory computer-readable medium that directs a data processing apparatus when executed thereby to perform operations to determine borehole position parameters from survey parameters, the operations comprising:
receiving a first stationary survey parameter, wherein the first stationary survey parameter is collected from a first stationary survey location, wherein the first stationary survey location is located in a borehole undergoing a drilling operation, where the borehole is located at a well site;
obtaining a set of continuous survey parameters, wherein the set of continuous survey parameters are collected from one or more continuous survey locations between the first stationary survey location and a second stationary survey location, and wherein the set of continuous survey parameters are obtained while the drilling operation remains in progress;
receiving a second stationary survey parameter, wherein the second stationary survey parameter is collected from the second stationary survey location;
computing a shift parameter and a tilt parameter for at least one continuous survey parameter in the set of continuous survey parameters, and a set of polynomial coefficients for a low order polynomial using the set of continuous survey parameters, the first stationary survey parameter, and the second station survey parameter;
generating a best fit for an intended borehole path using the low order polynomial by applying the shift parameter, the tilt parameter, and the set of polynomial coefficients as constraints to the low order polynomial, wherein the best fit is constrained by the first stationary survey location and the second stationary survey location;
calculating at least one borehole position parameter relative to the first stationary survey location or relative to the first stationary location utilizing the best fit; and
directing the adjusting of a drilling angle of a drill bit within the borehole to maintain an intended drilling path utilizing the at least one borehole position parameter.

19. The computer program product as recited in claim 18, further comprising:
communicating the borehole position parameter to one or more of a user, a well site controller, or a geo-steering system proximate the well site.

20. The computer program product as recited in claim 18, wherein the first stationary survey parameter, the second stationary survey parameter, and the set of continuous survey parameters are one or more of an inclination parameter or an azimuth parameter, and wherein the borehole position parameter includes one or more of a true vertical depth parameter, an Eastings and Northings pair parameter, a tortuosity parameter, or a micro-dogleg parameter.

* * * * *